Figure 4:
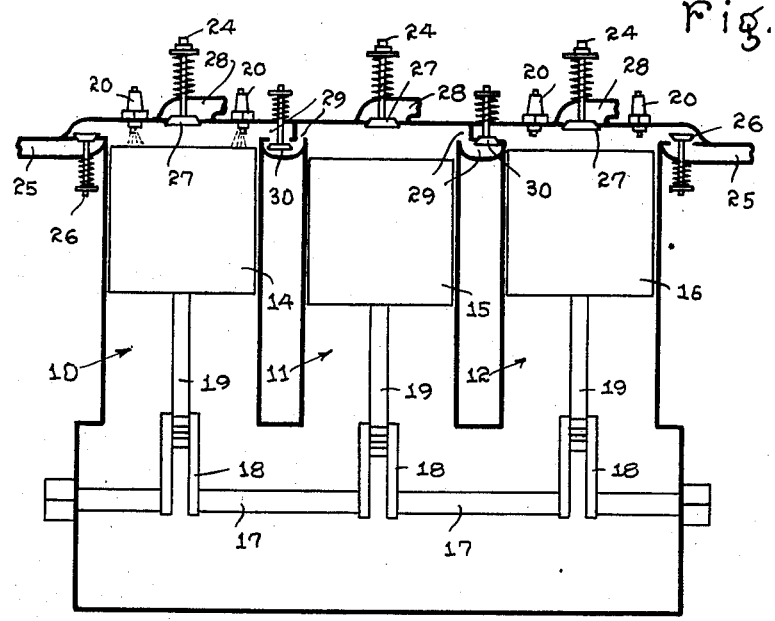

Dec. 27, 1932.  A. SCHWARZ  1,892,635
INTERNAL COMBUSTION ENGINE
Filed April 9, 1930    4 Sheets-Sheet 1
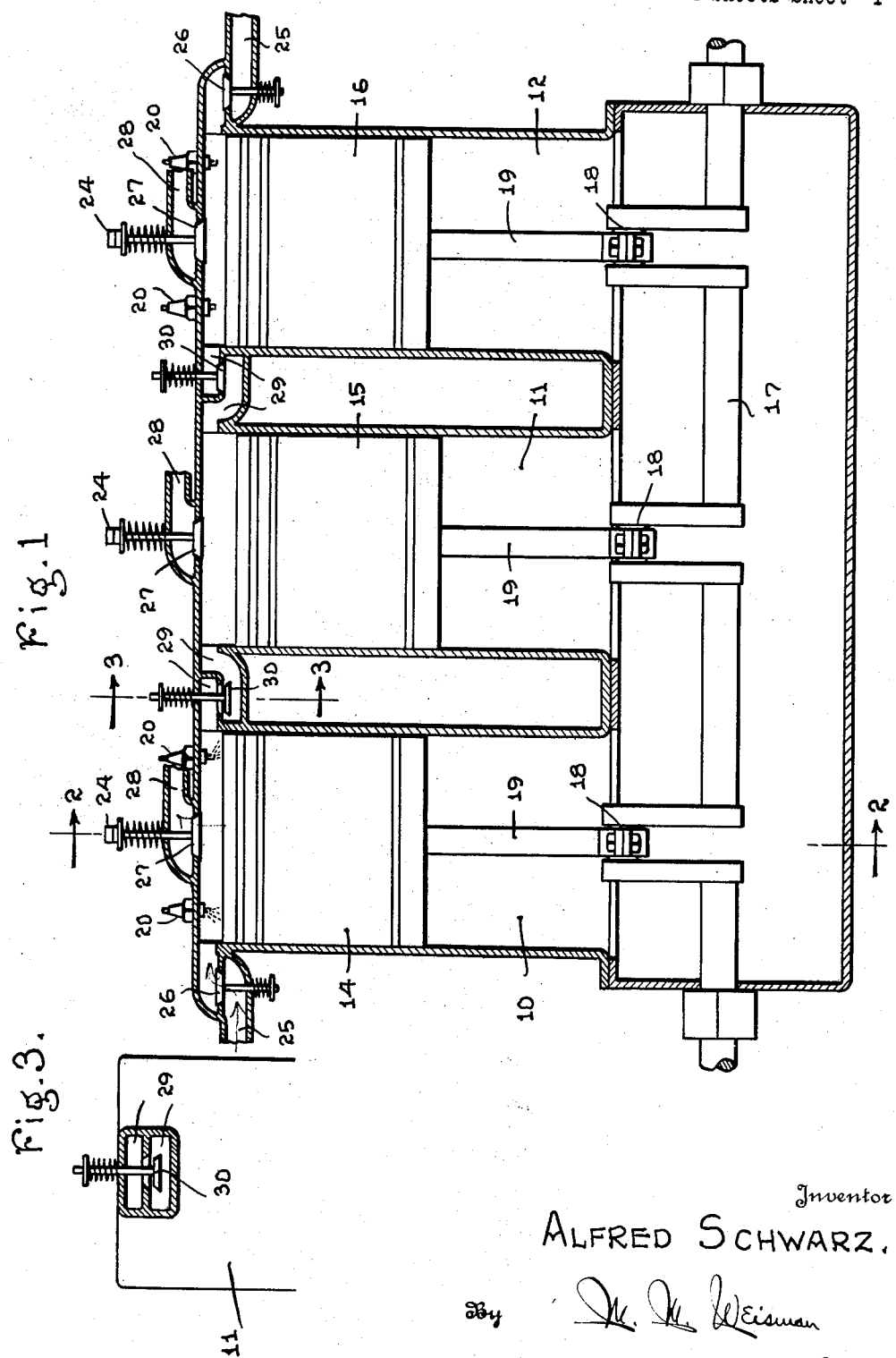
Inventor
ALFRED SCHWARZ.
By M. M. Weisman
Attorney Dec. 27, 1932.　　　A. SCHWARZ　　　1,892,635
INTERNAL COMBUSTION ENGINE
Filed April 9, 1930　　　4 Sheets-Sheet 2
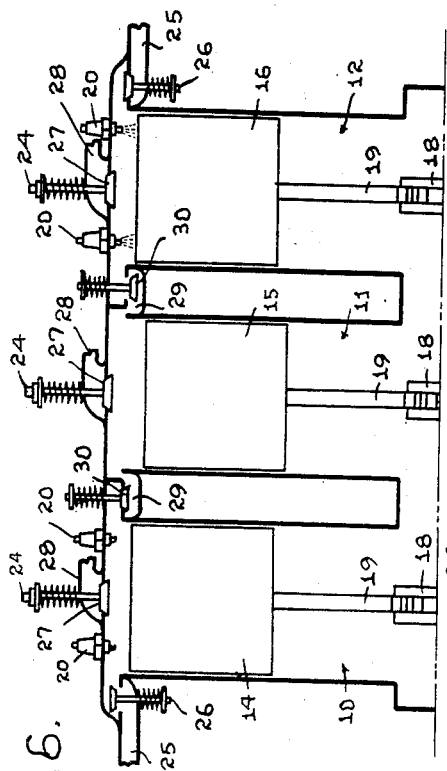
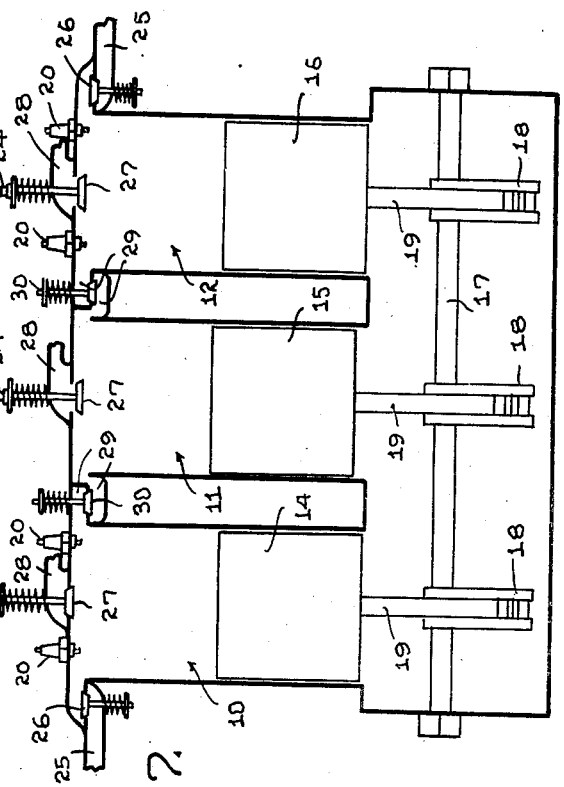
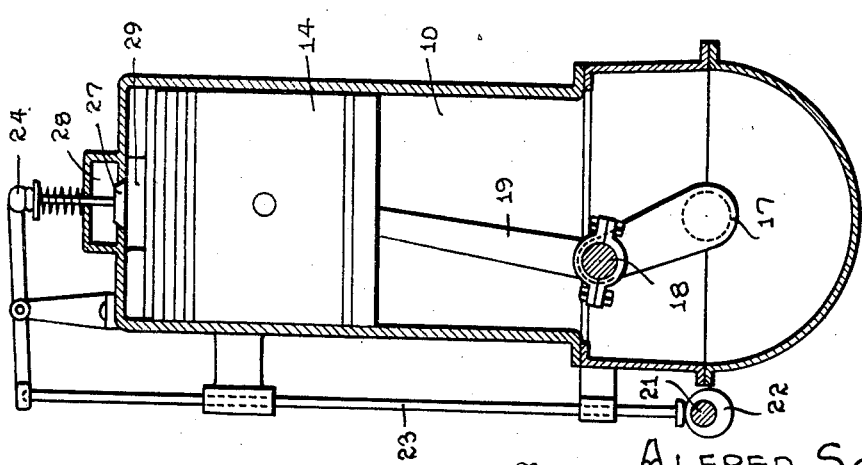
Inventor
ALFRED SCHWARZ.
By M. M. Weisman
Attorney Dec. 27, 1932.  A. SCHWARZ  1,892,635
INTERNAL COMBUSTION ENGINE
Filed April 9, 1930  4 Sheets-Sheet 3

Inventor
ALFRED SCHWARZ.

Inventor
Alfred Schwarz,
By
Attorney

Patented Dec. 27, 1932

1,892,635

UNITED STATES PATENT OFFICE

ALFRED SCHWARZ, OF UPPER MONTCLAIR, NEW JERSEY, ASSIGNOR, BY MESNE ASSIGNMENTS, TO HOLLY MOTORS CORPORATION, OF NEW YORK, N. Y., A CORPORATION OF DELAWARE

INTERNAL COMBUSTION ENGINE

Application filed April 9, 1930. Serial No. 442,858.

This invention relates to internal combustion engines, and deals more specifically with the mode of firing or exploding the fuel mixture to obtain higher thermal efficiency.

Internal combustion engines of present design have a very low thermal efficiency due to the fact that it is impossible in such engines to explode the entire charge at the beginning of the firing stroke because a detonation occurs when too much of the charge is thus fired. The recently started practice of mixing retarding agents with the gasoline or fuel to obtain a slower fire and consequently a smoother running engine has only reduced to even a lower level the average thermal efficiency for it has been conclusively proved that the slower the fire the lower the thermal efficiency, an offset gain having been made in saving of power otherwise lost by power of vibration.

The completeness of combustion depends upon the degree of compression of the charge at the moment of firing. If the charge is only ignited from a single spark the flame has of necessity to travel from the point of ignition to reach the other portions of the fuel, this being termed flame propagation. This flame propagation consumes time, and a portion of the charge is therefore ignited after the compression has been relieved to a considerable extent, and that portion burns both slowly and incompletely. Some of the compounds contained in the fuel are thus only converted into other combustibles, and a considerable quantity of such combustibles are discharged through the exhaust. A portion of the fuel is burned so slowly that it cannot give its energy to the crank shaft, and another portion is burned during the exhaust period, both of these portions being accordingly wasted.

It is accordingly a major purpose of the present invention to obtain a much higher thermal efficiency in internal combustion engines by firing the charge very rapidly, as by the use of a plurality of distributed or spaced igniting sparks so as to lessen flame propagation; to provide a relief of pressure at the moment of firing, to prevent a detonation or shock; and to maintain this relieved or what may be termed means effective pressure for an appreciable period of time so as to obtain a more complete conversion of heat into kinetic energy. I have disclosed and claimed one form of mechanism for accomplishing this same general purpose in my application for internal combustion engine, Serial No. 425,027, filed January 31, 1930. The present invention therefore constitutes to a certain extent a carrying forward or improvement of the broad principle disclosed in this earlier filed application.

It is a further object of the invention to increase the thermal efficiency of an internal combustion engine by providing an effective pressure which will not be excessive at its maximum and will be maintained for a longer period of time in order to complete combustion and restrict the fire to but a portion of the entire power or firing stroke of the piston, and further by more completely exhausting or scavenging the combustion chamber.

A further object of the present invention is to convert nearly all of the heat units generated during the combustion of the fuel, into kinetic energy and thereby minimize the heating of the engine, and the artificial cooling required to maintain an efficient running temperature.

The accompanying drawings fully illustrate one practical internal combustion engine embodying the present invention which will be described in detail to enable others to understand and use the same, but the invention is not considered restricted to the specific construction shown in the drawings and reference is therefore had to the claims for summaries of the essentials of the invention and of the novel features of construction and of the novel combinations of parts for all of which protection is desired.

In the accompanying drawings like characters of reference indicate like parts in the several views, and:—

Figure 5:
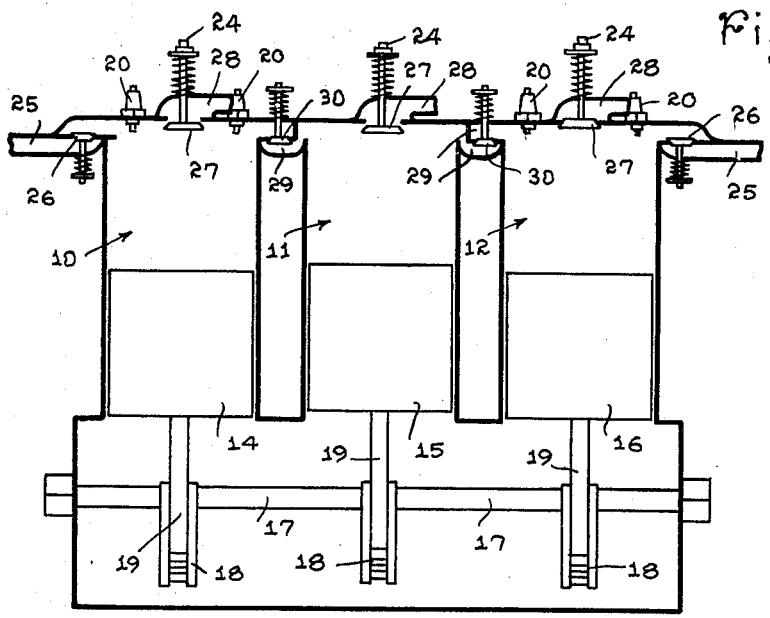
Figure 8:
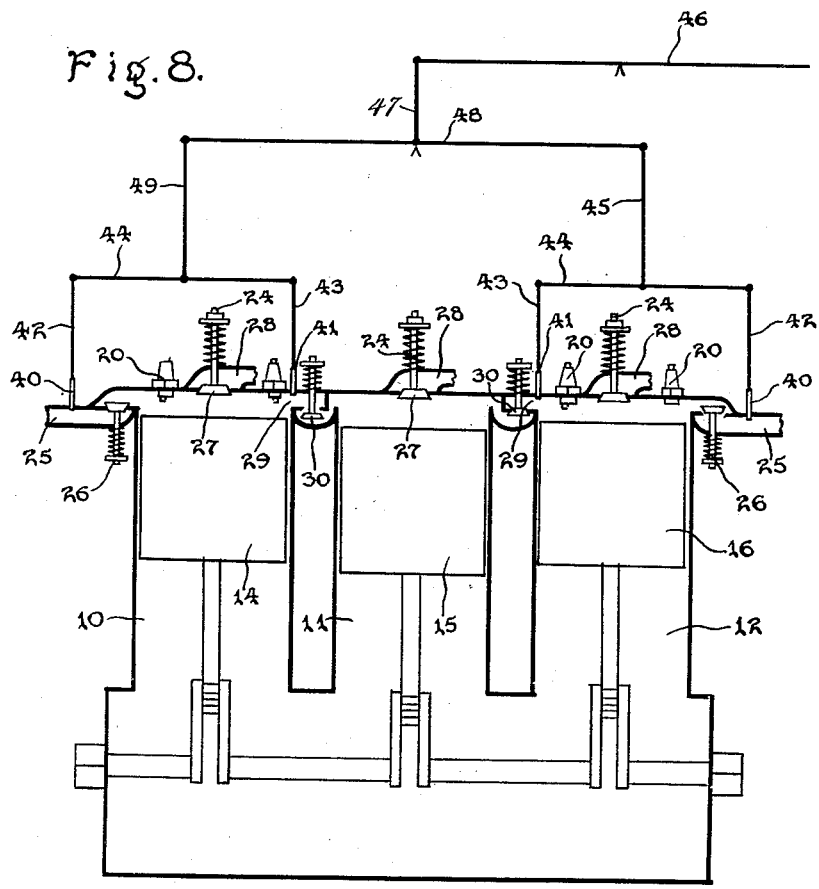
Figure 9:
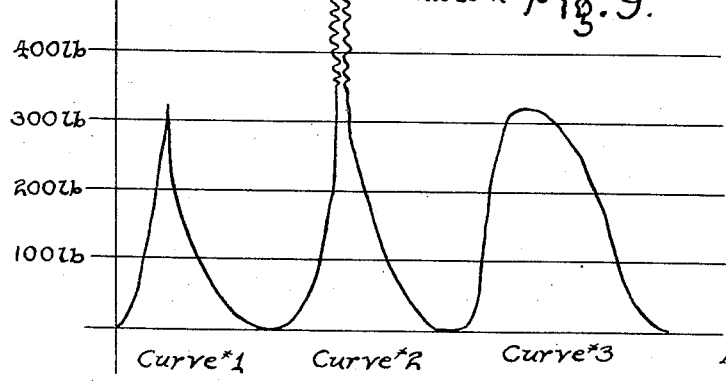

Figure 1 is a vertical median sectional view taken through the axes of a set of three internal combustion engine cylinders, Figure 2 is a vertical sectional view through one of the cylinders taken on the line 2—2 of Figure 1, Figure 3 is a fragmentary vertical sectional view taken on the line 3—3 of Figure 1, Figure 4 is a view similar to Figure 1 but illustrating diagrammatically the left hand cylinder with the piston therein at the start of its explosion stroke, Figure 5 is a view similar to Figure 4 but illustrating the piston at the start of its exhaust stroke, Figure 6 is a view similar to Figure 4 but illustrating the piston at the start of the suction stroke, Figure 7 is a view similar to Figure 4 but illustrating the piston at the beginning of the compression stroke, Figure 8 is a view similar to Figure 1 but illustrates a modification wherein a manually controlled throttle mechanism is illustrated, and Figure 9 illustrates diagrammatically three curves for the purpose of comparison.

In the internal combustion engine as here shown, only those parts are disclosed which directly concern the present invention, many details being therefore omitted which have not particular bearing, and the entire engine being illustrated somewhat conventionally in regard to certain parts thereof.

The present invention briefly described consists of an internal combustion engine including a plurality of cylinders operating in conjunction with each other, whereby one cylinder fires the charge and a neighboring cylinder has admitted thereto, by means of a mechanically or automatically operated valve, a part of the charge and converts it into power and exhausts the waste gases, and at the next stroke the neighboring or second cylinder receives part of the exploded charge of a third cylinder so that the two cylinders in which the explosions take place operate on the four-cycle principle, and one intermediate cylinder only receives and exhausts already exploded gases.

As shown in the drawings, there are provided three cylinders 10, 11, and 12, the cylinders 10 and 12 being those in which explosions take place in the usual manner and operating on the four stroke cycle, while the cylinder 11 lies intermediate the other two cylinders and operates by the explosive pressure fed thereto from cylinders 10 and 12.

In each of these cylinders reciprocates the usual piston as indicated respectively at 14, 15 and 16. The engine is further provided with the usual crank shaft 17 including the customary off-set crank portions 18 connected to the pistons by connecting rods 19 all as is well known in the art. The cylinders 10 and 12 are likewise provided with the ordinary spark plugs 20 arranged to spark in timed relation by conventional distributing or timing means (not shown) so that the sparks for firing are emitted by these plugs alternately at proper periodic time intervals. Any desired number of spark plugs might be provided for each of the cylinders 10 and 12 whereby to assure the relatively instantaneous explosion of the entire charge within the respective cylinder, but two plugs per cylinder being illustrated. Finally the engine may have the usual cam shaft 21 connected in the conventional manner (also not shown) to the crank shaft 17 and provided with cams 22 actuating the left rods 23 and levers 24 for operating certain valves in proper timed relationship, as will be hereinafter more fully described.

Referring now to the elements peculiar to this invention, it will be noted that each of the cylinders 10 and 12 are provided with an inlet manifold or pipe 25 for admitting or conducting the explosive charges to these cylinders, and the admission of the charge for the respective cylinder is illustrated as being controlled by a normally spring closed inwardly opening poppet valve 26. By this means the pistons 14 and 16 on their suction strokes draw explosive charges into their respective cylinders. Also each of the cylinders 10, 11 and 12 is illustrated as being provided with an inwardly opening spring closed poppet valve 27 controlling the exhaust from these cylinders through the several branches 28 of the exhaust manifold. These valves 26 and 27 may be opened at the proper times by the action of the cam shaft 21 in the usual manner as suggested in Fig. 2. Passages 29 connect the cylinders 10 and 12 with the cylinder 11, and the flow of gases through these passages is controlled by normally closed valves 30 opening toward the cylinder 11. I do not desire to limit myself to the use of any particular type of valve or operating mechanism and particularly in so far as the valves 30 are concerned. These valves 30 may be of the poppet, rotary cylinder, sliding plate, sleeve, or any other type desired. Their action may be either automatically controlled by changes in cylinder pressure, or they may be mechanically controlled to operate at desired time intervals.

From an examination of Figure 4 of the drawings, it will be seen that the piston 14 is at the beginning of its explosion stroke, sparks having just passed across the terminals of its spark plugs. At this time, the piston 16 has just completed its exhaust stroke. As the explosion takes place in the cylinder 10, part of the exploded charge forces the valve 30 between the cylinders 10 and 11 open, and pressure is thus exerted on both the pistons 14 and 15.

In Figure 5 of the drawings, the piston 14 is at the beginning of its exhaust stroke, and the exhaust valves 27 of cylinders 10 and 11 have been opened, so that the spent gases may be exhausted therefrom. Meanwhile, or during the period of movement or travel of the piston 14 from the position illustrated in Figure 4 to that illustrated in Figure 5, the piston 16 has passed through its suction stroke, drawing a charge of fuel in through the valve 26 of the cylinder 12, the valve 27 of that cylinder being closed. This piston 16 now ascends on its compression stroke, and it is to be noted that the springs controlling the poppet valves 30 are sufficiently strong to prevent the opening of these valves under the effects of compression. During the next step in the following out of the cycle of operation of this engine, the explosion takes place in the cylinder 12, see Figure 6 of the drawings, and the valve 30 between the cylinder 12 and the cylinder 11 opens to permit part of the exploded charge to pass therethrough so that both the pistons 16 and 15 are urged downwardly after passing their dead centers.

Upon the completion of this stroke, these pistons again move upwardly, as in Figure 7 of the drawings, the exhaust valves 27 of the cylinders 11 and 12 being at this time opened through the usual operation of the cam shaft, to permit of the exhausting of the spent gases from these cylinders. At the same time the piston 14 is going through its intake or suction stroke and its compression stroke, as previously described with reference to the piston 16, and the cycle of operation starts over again.

From the foregoing it will be apparent that the cylinders 10 and 12 operate on the four stroke cycle, while the piston in the cylinder 11 operates on excess gas from the cylinders 10 and 12 to receive a downward impulse with every revolution of the crank shaft. Obviously any desired number of sets of three cylinders may operate on, or be suitably geared to a single shaft to effect proper balance of the power impulses as may be desired.

An internal combustion engine constructed in accordance with the present invention will consume less fuel for a given horse-power, produce more power for a given cylinder content, and require less artificial cooling during operation for the reasons that substantially all of the heat generated during the operation thereof is converted into kinetic energy, and the quantity of fuel burned during the exhaust period becomes negligible. There will further be a substantial increase in power for a given cubic displacement, due to the fact that were three cylinders operated on the four stroke cycle principle there would of course be but three power strokes in two revolutions of the crank shaft, whereas, in an engine constructed in accordance with the present invention, with but three cylinders there are four power strokes in two revolutions of the crank shaft, due as hereinbefore set forth, to the fact that the intermediate cylinder receives a power impulse every revolution.

It will be noted that the disposition of the crank portions 18, to which the several pistons are connected through the hereinbefore mentioned connecting rods 19, of the crank shaft 17 is such that the pistons 14, 15 and 16 travel in the same directions substantially throughout their movements; the pistons 14 and 16 being designed to travel in entire unison while the piston 15 is slightly later in its position thus to hold the compression in the cylinders 10 and 12 respectively longer while the explosion takes place. The entire arrangement serves the further essential purposes of giving the exploding cylinder temporary relief to avoid possibility of excess explosion pressures by opening valves 30 and at the same time extends the compression period by compensating by means of the late position of the piston 15 for any decrease of pressure occurring when the pistons 14 and 16 begin their power strokes.

In Figure 8 I have illustrated a throttle control which includes sliding throttle valves 40 in each of the intake manifolds 25 and sliding valves 41 in each of the passages 29. It will be seen that the valves 40 are located in advance of the intake valves 26 while the valves 41 are located in advance of the valves 30, that is between the cylinders 10 and 12 and the valves 30. The valves 40 and 41 are all operated by a single control mechanism. This mechanism includes links 42 and 43 which are pivotally connected to equalizing bars 44, each bar having one of each of the links 42 and 43 connected thereto. One of the bars 44 is connected by a link 45 to a lever 48 which is connected by a link 47 to a lever 46. A link 49 connects the lever 48 to the second equalizing bar 44.

It is to be understood that any other form of valve may be used than the sliding valves 40 and 41, such for instance as rotary valves. The valves 40 and 41 may be adjusted to close in unison and to the same extent as the valves 40 or the valves 41 may close or open in advance of or behind the valves 40.

I may find it desirable to use automatic pressure controlled valves at 30 which will open at a pressure in excess of the desired initial pressure, say 355 pounds per square inch. Then assuming that the throttle valves 40 are three-quarters closed, the cylinders 10 and 12 would have only 350 pounds pressure and the valves 30 would not open. The middle cylinder 11 then would receive none of the gases and would idle. This would overcome the great objection which now exists to internal combustion engines, namely they take say three-quarters of a pound of fuel per horse-power under full load and three pounds of fuel per horse-power under light loads due to lack of compression on partly closed throttle. This same result may be accomplished with the throttle mechanism shown in Figure 8 having the valves regulated or interconnected so that the valves 41 will be closed when the valves 40 are one-quarter open, causing cylinder 11 to idle.

In Figure 9 I have illustrated three different curves or graphs which represent the different actions of an internal combustion engine operating under the following conditions:

Curve No. 1 represents an ordinary engine operating on gasoline as fuel.

Curve No. 2 represents the same engine operating on the same fuel but with the charge fired by a plurality of distributed sparks with no relief at the time of firing. The detonation which occurs under such conditions sets up vibrations which kill a high percentage of the power.

Curve No. 3 represents the operation of an engine of the type embodying this invention with the piston 15 operating 20° behind the pistons 14 and 16. These curves of course are only illustrative and are not represented as being reproductions of calibrated instrument produced graphs.

It will be obvious to any one skilled in the art that minor changes may be made in the form and construction of the engine without departing from the material principles involved. It is not therefore desired to confine the invention to the specific form herein disclosed and described, but it is desired to include all such as properly come within the scope claimed.

Having described my invention, I claim:

1. In an internal combustion engine, an explosion cylinder, a receiving cylinder for a portion of the still burning gas fired in the explosion cylinder, a passage connecting said cylinders, a controlled valve in said passage opening toward the receiving cylinder, pistons reciprocating in said cylinders, a crank shaft, and operative connections between said shaft and pistons arranged to cause said pistons to travel in the same directions substantially throughout their movements with the piston in the receiving cylinder being arranged to lag slightly behind the piston in the other cylinder, causing sustained pressure in the explosion cylinder after ignition which lasts until the lagging piston passes top dead-center.

2. In an internal combustion engine, an explosion cylinder, a receiving cylinder for a portion of the still burning gas fired in the explosion cylinder, a passage connecting said cylinders, a controlled valve in said passage opening toward the receiving cylinder, pistons reciprocating in said cylinders, a crank shaft, a second explosion cylinder, a second passage connecting the second explosion cylinder with the receiving cylinder, a controlled valve in said second passage opening toward the receiving cylinder, a piston in the second explosion cylinder, connections between all of the pistons and the crank shaft arranged to cause the pistons in the explosion cylinders to move in unison in the same direction during reciprocation thereof while the piston in the receiving cylinder is arranged to lag slightly behind the pistons in the explosion cylinders, and means for firing the charges in the explosion cylinders before the piston in the receiving cylinder reaches top dead-center so that a predetermined pressure is maintained in the explosion cylinders until the piston in the receiving cylinder completes its upward stroke.

3. In an internal combustion engine, an explosion cylinder, a receiving cylinder for a portion of the still burning gas fired in the explosion cylinder, a passage connecting said cylinders, an automatic pressure regulating valve in said passage opening toward the receiving cylinder, pistons reciprocating in said cylinders, a crank shaft, operative connections between said shaft and pistons arranged to cause said pistons to travel in the same directions substantially throughout their movements, a second explosion cylinder, a second passage connecting the second explosion cylinder with the receiving cylinder, an automatic pressure regulating valve in said second passage opening toward the receiving cylinder, a piston in the second explosion cylinder, a connection between the last piston and the crank shaft arranged to cause the pistons in the explosion cylinders to move in unison but in pressure regulating relation to each other in the same direction during reciprocation thereof, and means to fire charges in the explosion cylinders alternately.

4. In an internal combustion engine, an explosion cylinder, a receiving cylinder, a passage connecting said cylinders, a valve in said passage opening toward the receiving cylinder, pistons reciprocating in said cylinders, a crank shaft, a second explosion cylinder, a second passage connecting the second explosion cylinder with the receiving cylinder, a piston in the second explosion cylinder, a valve in the second passage opening toward the receiving cylinder, connections between all of the pistons and the crank shaft arranged to cause the pistons in the explosion cylinders to move in unison in the same direction during reciprocation thereof while the piston in the receiving cylinder is arranged to lag slightly behind the pistons in the explosion cylinders, and means to fire charges in the explosion cylinders alternately and before the piston in the receiving cylinder reaches top dead-center.

5. In an internal combustion engine, in combination, a pair of explosion cylinders, an intermediate cylinder disposed therebetween, passages connecting the explosion cylinders with the intermediate cylinder, valves in said passages, the said valves being adapted to alternately open upon each explosion in an explosion cylinder to admit part of the exploding charge to the intermediate cylinder, a crank shaft, pistons in each of the cylinders, and operative connections between the said shaft and pistons to cause the piston of the intermediate cylinder to maintain for a prolonged period the explosion pressure in the firing cylinders.

6. In an internal combustion engine, in combination, a pair of explosion cylinders, an intermediate cylinder disposed therebetween, passages connecting the explosion cylinders to the intermediate cylinder, automatic valves in said passages, the said valves being adapted to alternately open upon each explosion in an explosion cylinder to admit part of the burning charge to the intermediate cylinder, a crank shaft, a piston in each cylinder, operative connections between the crank shaft and the pistons to cause the pistons in the explosion cylinders to move in unison in the same direction while the piston in the intermediate cylinder is adapted to lag slightly behind the pistons in the explosion cylinders, and means to fire charges in the explosion cylinders alternately and before the piston in the receiving cylinder reaches top dead-center.

7. In an internal combustion engine, in combination, a pair of explosion cylinders, an intermediate cylinder disposed therebetween, passages connecting the explosion cylinders with the intermediate cylinders, valves in said passages, the said valves being adapted to alternately open upon each explosion in an explosion cylinder to admit part of the burning charge to the intermediate cylinder, means to admit a charge of fuel to each of the explosion cylinders alternately, throttling means for controlling said passages and the amount of charge admitted to the explosion cylinders, means to fire charges in the explosion cylinders alternately, a crank shaft, a piston in each of the cylinders and operative connections between the shaft and pistons to cause the said pistons to reciprocate in proper time relationship, substantially as described.

In testimony whereof he affixes his signature.

ALFRED SCHWARZ.